(12) United States Patent
Kawamura

(10) Patent No.: US 7,116,347 B2
(45) Date of Patent: Oct. 3, 2006

(54) OPTICAL SCANNING DEVICE AND IMAGE FORMING SYSTEM INCLUDING THE SAME

(75) Inventor: Atsushi Kawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 816 days.

(21) Appl. No.: 09/985,753

(22) Filed: Nov. 6, 2001

(65) Prior Publication Data

US 2002/0093566 A1    Jul. 18, 2002

(30) Foreign Application Priority Data

Nov. 7, 2000  (JP) ............................. 2000-339241
Mar. 19, 2001 (JP) ............................. 2001-078550

(51) Int. Cl.
  *B41J 2/435* (2006.01)
(52) U.S. Cl. .................................... 347/249
(58) Field of Classification Search ............... 359/205, 359/207, 648, 651, 662–663; 347/244, 258, 347/234–235, 248–250; 250/235; 358/474
See application file for complete search history.

(56) References Cited

U.S. PATENT DOCUMENTS

| | | | |
|---|---|---|---|
| 4,760,251 A * | 7/1988 | Shimada et al. ............ 250/235 |
| 5,128,795 A * | 7/1992 | Endou et al. ................ 359/207 |
| 5,148,304 A * | 9/1992 | Kawabata .................... 359/207 |
| 5,175,636 A * | 12/1992 | Swanberg .................... 358/474 |
| 5,333,067 A * | 7/1994 | Chung ........................ 358/474 |
| 5,715,079 A * | 2/1998 | Ono ............................ 359/205 |
| 6,157,400 A * | 12/2000 | Genovese .................... 347/250 |
| 6,185,026 B1 | 2/2001 | Hayashi et al. ............. 359/204 |
| 6,198,562 B1 | 3/2001 | Hayashi et al. ............. 359/204 |
| 6,429,956 B1 | 8/2002 | Itabashi ...................... 359/204 |
| 6,462,853 B1 | 10/2002 | Hayashi ...................... 359/205 |

FOREIGN PATENT DOCUMENTS

| | | |
|---|---|---|
| JP | 10-333069 | 12/1998 |
| JP | 11-64760 | 3/1999 |

OTHER PUBLICATIONS

U.S. Appl. No. 10/127,768, filed Apr. 23, 2002, unknown.
U.S. Appl. No. 09/946,482, filed Sep. 6, 2001, unknown.
U.S. Appl. No. 09/955,181, filed Sep. 19, 2001, unknown.
U.S. Appl. No. 09/653,330, filed Aug. 31, 2000, allowed.
U.S. Appl. No. 09/715,151, filed Nov. 20, 2000, pending.
U.S. Appl. No. 09/765,608, filed Jan. 22, 2001, pending.
U.S. Appl. No. 09/769,510, filed Jan. 26, 2001, pending.

(Continued)

*Primary Examiner*—Hai Pham
(74) *Attorney, Agent, or Firm*—Oblon, Spivak, McClelland, Maier & Neustadt, P.C.

(57) ABSTRACT

An optical scanning device includes a scanning optical system scans an image surface in a main scanning direction by focusing a deflected light beam onto the image surface as a beam spot, the scanning optical system providing an amount of linearity at an outer peripheral end of the image surface. An optical writing unit controls ON/OFF state of a light source in accordance with an image signal. A frequency dividing unit generates a secondary frequency of a pixel clock, which is equal to an initial frequency of the pixel clock divided by an integer. An electrical correction unit adjusts the secondary frequency of the pixel clock with respect to each of respective pixels included in the image signal, when the beam spot is located near the outer peripheral end of the image surface, so as to obtain uniform-velocity characteristics.

13 Claims, 10 Drawing Sheets

OTHER PUBLICATIONS

U.S. Appl. No. 09/788,415, filed Feb. 21, 2001, pending.
U.S. Appl. No. 09/810,184, filed Mar. 19, 2001, pending.
U.S. Appl. No. 09/816,378, filed Mar. 26, 2001, pending.
U.S. Appl. No. 09/827,097, filed Apr. 6, 2001, pending.
U.S. Appl. No. 09/833,821, filed Apr. 13, 2001, pending.
U.S. Appl. No. 09/860,520, filed May 21, 2001, pending.
U.S. Appl. No. 09/873,256, filed Jun. 5, 2001, pending.
U.S. Appl. No. 09/910,797, filed Jul. 24, 2001, pending.
U.S. Appl. No. 09/946,665, filed Sep. 6, 2001, pending.
U.S. Appl. No. 09/968,546, filed Oct. 2, 2001, pending.
U.S. Appl. No. 09/982,831, filed Oct. 22, 2001, pending.
U.S. Appl. No. 09/985,753, filed Nov. 6, 2001, pending.
U.S. Appl. No. 10/028,698, filed Dec. 28, 2001, pending.
U.S. Appl. No. 10/047,698, filed Jan. 18, 2002, pending.
U.S. Appl. No. 10/059,371, filed Jan. 31, 2002, pending.
U.S. Appl. No. 10/047,092, filed Jan. 17, 2002, pending.
U.S. Appl. No. 10/084,485, filed Feb. 28, 2002, pending.
U.S. Appl. No. 10/085,707, filed Mar. 1, 2002, pending.
U.S. Appl. No. 10/101,937, filed Mar. 21, 2002, pending.
U.S. Appl. No. 10/247,702, filed Sep. 20, 2002, pending.
U.S. Appl. No. 09/985,753, filed Nov. 6, 2001, Kawamura.
U.S. Appl. No. 10/345,365, filed Jan. 16, 2003, Kawamura et al.
U.S. Appl. No. 09/985,753, filed Nov. 6, 2001, Kawamura.
U.S. Appl. No. 10/659,342, filed Sep. 11, 2003, Kawamura.

* cited by examiner

| MAIN SCANNING DIRECTION | | | | | | |
|---|---|---|---|---|---|---|
| IMAGE HEIGHT | | 150.0 | 100.0 | 0.0 | -100.0 | -150.0 |
| DEFOCUS | -0.80 | 35.61 | 34.49 | 33.84 | 34.46 | 35.78 |
| | -0.70 | 33.76 | 32.77 | 32.26 | 32.74 | 33.92 |
| | -0.60 | 31.77 | 30.54 | 30.15 | 30.49 | 31.96 |
| | -0.50 | 28.10 | 17.65 | 16.94 | 17.55 | 28.39 |
| | -0.40 | 16.90 | 16.20 | 15.73 | 16.14 | 17.14 |
| | -0.30 | 15.81 | 15.55 | 15.23 | 15.52 | 15.94 |
| | -0.20 | 15.30 | 15.21 | 14.93 | 15.19 | 15.37 |
| | -0.10 | 15.04 | 15.05 | 14.80 | 15.05 | 15.08 |
| | 0.00 | 14.96 | 15.03 | 14.80 | 15.04 | 14.96 |
| | 0.10 | 15.04 | 15.12 | 14.93 | 15.13 | 15.01 |
| | 0.20 | 15.29 | 15.38 | 15.18 | 15.40 | 15.23 |
| | 0.30 | 15.75 | 15.81 | 15.58 | 15.84 | 15.71 |
| | 0.40 | 16.81 | 16.74 | 16.27 | 16.81 | 16.60 |
| | 0.50 | 20.24 | 18.64 | 17.57 | 18.82 | 19.07 |
| | 0.60 | 30.95 | 29.49 | 23.07 | 29.57 | 30.89 |
| | 0.70 | 33.24 | 32.14 | 29.76 | 32.18 | 33.20 |
| | 0.80 | 35.33 | 34.07 | 31.92 | 34.11 | 35.30 | ns
OPTICAL SCANNING DEVICE AND IMAGE FORMING SYSTEM INCLUDING THE SAME

BACKGROUND OF THE INVENTION

1. Field of the Invention

The present invention relates to an optical scanning device that scans an image surface within an image forming system by focusing a light beam from a light source on the image surface. Moreover, the present invention relates to an image forming system in which the optical scanning device is provided. The optical scanning device of the present invention is appropriate for use in digital copiers, laser printers and laser facsimiles.

2. Description of the Related Art

In many conventional optical scanning devices, the optical parameters of each optical scanning device are optimized in order to provide good performance for all the necessary optical characteristics of the optical scanning device. However, the optical characteristics, which must be corrected by the optical parameter optimization, include the main-scanning or sub-scanning field curvature, the wavefront aberration, the linearity and the scanning line deviation. It is difficult to achieve an easy-to-manufacture, cost-effective configuration of the optical scanning device while providing good performance for all the necessary optical characteristics. In many conventional optical scanning devices, the easy-to-manufacture, cost-effective configuration is traded off for obtaining a reasonable level of the necessary optical characteristics.

For example, even if an optical scanning device has a certain amount of linearity, it is possible to provide the cost-effective configuration and the uniform-velocity characteristics for the optical scanning device. Japanese Laid-Open Patent Application No. 10-333069 discloses such an optical scanning device. The optical scanning device of the above document provides good performance for the uniform-velocity characteristics (the linearity=±0.1%). Moreover, Japanese Laid-Open Patent Application No. 11-64760 discloses a similar optical scanning device. The optical scanning device of the above document provides good performance for the uniform-velocity characteristics (the linearity=−0.1% to +0.2%).

The optical parameter optimization is a conceivable method for increasing the performance of the optical scanning device. However, the optimization for all the necessary optical characteristics of the optical scanning device requires a large amount of time and effort, and it is difficult to determine the easy-to-manufacture, cost-effective design of the optical scanning device while the optical parameter optimization is obtained.

Suppose an optical scanning device that scans an image surface by focusing a deflected light beam from a rotary deflector which is rotated at a uniform-velocity. The scanning speed becomes relatively large (when compared to the uniform-velocity level) as the beam spot, created as a result of the focusing of the deflected light beam, approaches an outer peripheral end of the image surface in the main scanning direction. The linearity of the scanning light beam on the image surface has a positive value and it tends to be excessively large. A simple method for correcting the excessive linearity is that a meniscus lens "L" having a convex lens surface, facing a reflection point "P" of a rotary deflector, and a relatively small lens power is located adjacent to the rotary deflector, as shown in FIG. 6. When the meniscus lens "L" is used, the light beam from the rotary deflector is converted at the meniscus lens "L" into a refracted light beam as indicated by the dotted line in FIG. 6. It is possible to correct the excessive linearity at the outer peripheral end of the image surface so as to approach the uniform-velocity characteristics by using the meniscus lens "L".

However, the convex and concave lens surfaces of the meniscus lens "L" are not concentric with respect to the reflection point "P" of the rotary deflector, and the use of the meniscus lens "L" is detrimental to increasing the optical system performance of the optical scanning device.

SUMMARY OF THE INVENTION

An object of the present invention is to provide an improved optical scanning device in which the above-described problems are eliminated.

Another object of the present invention is to provide an optical scanning device that provides good performance for the optical characteristics by using an electrical correction unit that obtains the uniform-velocity characteristics, with the use of a certain amount of linearity at the outer peripheral end of the image surface in the main scanning direction.

Another object of the present invention is to provide an image forming system in which an optical scanning device is provided such that the optical scanning device provides good performance for the optical characteristics by using an electrical correction unit that obtains the uniform-velocity characteristics, with the use of a certain amount of linearity at the outer peripheral end of the image surface in the main scanning direction.

The above-mentioned objects of the present invention are achieved by an optical scanning device comprising: a light source which emits a light beam based on a pixel clock; a scanning optical system which scans an image surface in a main scanning direction by focusing a deflected light beam, derived from the light beam of the light source, onto the image surface as a beam spot, the scanning optical system providing an amount of linearity at an outer peripheral end of the image surface; an optical writing unit which controls ON/OFF state of the light source in accordance with an image signal; a frequency dividing unit which is connected to the optical writing unit and generates a secondary frequency of the pixel clock at an output thereof, equal to an initial frequency of the pixel clock at an input thereof divided by a divisor integer; and an electrical correction unit which adjusts the secondary frequency of the pixel clock at the output of the frequency dividing unit with respect to each of respective pixels included in the image signal, when the beam spot is located near the outer peripheral end of the image surface, so as to obtain uniform-velocity characteristics.

The above-mentioned objects of the present invention are achieved by an image forming system in which an optical scanning device and an image forming device are provided, the image forming device forming a latent image on an image surface of a photoconductor by using a beam spot created by the optical scanning device, the optical scanning device comprising: a light source which emits a light beam based on a pixel clock; a scanning optical system which scans the image surface in a main scanning direction by focusing a deflected light beam, derived from the light beam of the light source, onto the image surface as the beam spot, the scanning optical system providing an amount of linearity at an outer peripheral end of the image surface; an optical writing unit which controls ON/OFF state of the light source in accordance with an image signal; a frequency dividing unit which is connected to the optical writing unit and generates a secondary frequency of the pixel clock at an output thereof, equal to an initial frequency of the pixel clock at an input thereof divided by a divisor integer; and an electrical correction unit which adjusts the secondary frequency of the pixel clock at the output of the frequency dividing unit with respect to each of respective pixels included in the image signal, when the beam spot is located near the outer peripheral end of the image surface, so as to obtain uniform-velocity characteristics.

In the optical scanning device of the present invention, the scanning optical system provides an amount of linearity at the outer peripheral end of the image surface. The scanning speed becomes relatively large as the beam spot approaches the outer peripheral end of the image surface. In this condition, the electrical correction unit adjusts the secondary frequency of the pixel clock at the output of the frequency dividing unit with respect to each of respective pixels included in the image signal, so as to obtain the uniform-velocity characteristics. The optical scanning apparatus of the present invention is effective in providing good performance for the optical characteristics with the use of a certain amount of linearity at the outer peripheral end of the image surface in the main scanning direction.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 1:
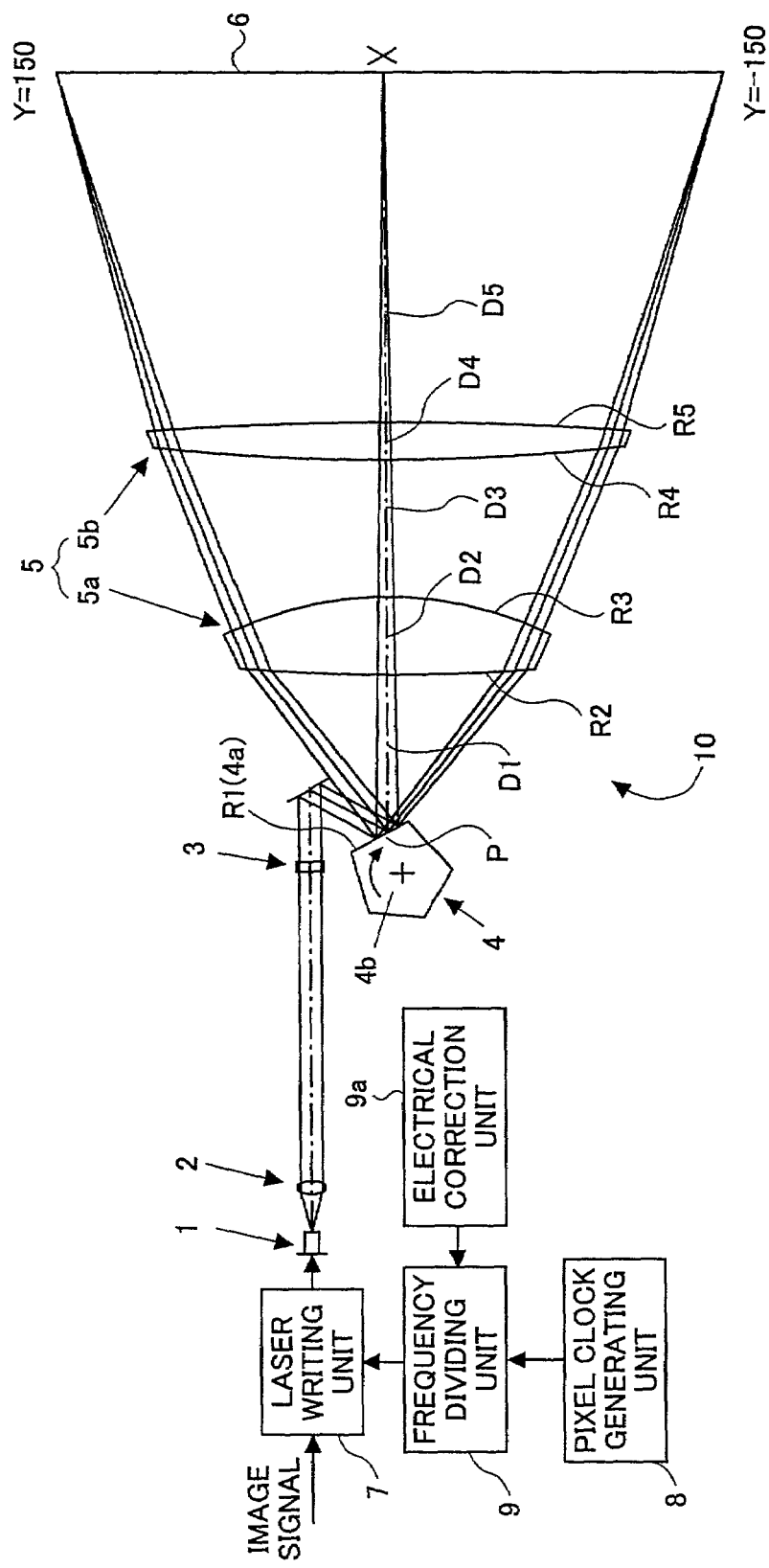
FIG. 1 is a cross-sectional view of a first preferred embodiment of the optical scanning device of the invention taken along a main-scanning cross-section thereof.

FIG. 1 shows a first preferred embodiment of the optical scanning device of the invention taken along a main-scanning cross-section thereof.

As shown in FIG. 1, in the optical scanning device 10 of the present embodiment, a coupling lens 2 couples a light beam emitted by a light source 1, such as a laser diode, and provides a cylindrical lens 3 with the coupled beam. The cylindrical lens 3 converts the coupled beam from the coupling lens 2 into a converging beam. The converging beam from the cylindrical lens 3 is reflected to a rotary deflector 4 by a mirror such that the reflected converging beam forms a longitudinal line image on a reflection surface 4a of the rotary deflector 4, the line image extending in the main scanning direction. The rotary deflector 4 is rotated clockwise around a rotation axis 4b as indicated by the arrow in FIG. 1, and the light beam, reflected on the reflection surface 4a of the rotary deflector 4, is deflected at a constant angular velocity. The light beam from the rotary deflector 4 is passed through a scanning lens device 5 to an image surface 6 of a photoconductor (not shown).

Hereinafter, the optical system that includes the coupling lens 2, the cylindrical lens 3, the rotary deflector 4 and the scanning lens device 5, provided within the optical scanning device 10, is called a scanning optical system.

The scanning optical system, including the scanning lens device 5, scans the image surface 6 in the main scanning direction at a generally uniform velocity by focusing the deflected light beam from the rotary deflector 4 onto the image surface 6 as a beam spot. Hence, in the optical scanning device 10 of the present embodiment, the image surface 6 is scanned along the main scanning line in the main scanning direction by applying the beam spot created by the scanning optical system.

In an image forming system that uses the optical scanning device 10 of the present embodiment, the image surface 6 is constituted by a surface of a photoconductor. For example, the photoconductor is provided in the form of a cylindrical drum or an endless belt within the image forming system. The image surface 6 of the photoconductor is moved relative to the optical scanning device 10 at a rate synchronized with the rotation speed of the rotary deflector 4, in the sub-scanning direction perpendicular to the main scanning direction. In the image forming system, the photoconductor image surface 6 is electrostatically charged. When the image surface 6 is subjected to the optical scanning by the optical scanning device 10 of FIG. 1, an electrostatic latent image is formed on the image surface 6. For example, the latent image is visualized into a toned image by development of the latent image using electrostatically-charged toner particles. The toned image is electrostatically transferred from the photoconductor to a recording medium (usually, paper). The toner is thermally fused to the recording medium. Hence, the image forming system finally forms the image on the recording medium.

In the optical scanning device 10 of FIG. 1, an image signal is input to a laser writing unit 7. The ON/OFF state of the light source 1 (the laser diode) is controlled by the laser writing unit 7 in accordance with the input image signal. A pixel clock generating unit 8 generates a pixel clock at a predetermined initial frequency that is normally a high frequency. A frequency dividing unit 9 generates a secondary frequency of the pixel clock at its output, which is equal to the initial frequency of the pixel clock at its input (received from the pixel clock generating unit 8) divided by a divisor integer. The secondary frequency of the pixel clock, generated at the output of the frequency dividing unit 9, is lower than the initial frequency of the pixel clock at the input thereof. The pixel clock output from the frequency dividing unit 9 is supplied to the laser writing unit 7 concurrently with the image signal. The laser writing unit 7 controls the light source 1 (the laser diode) so that the light source 1 is turned on and off in accordance with the image signal based on the secondary frequency of the pixel clock at the output of the frequency dividing unit 9, so that the light source 1 emits the laser light beam based on the secondary frequency.

In the present embodiment, the scanning lens device 5 includes a first scanning lens 5a that is a positive lens and a second scanning lens 5b that is a positive lens. A refractive lens power of the scanning lens device 5 is allocated to the two positive lenses such that the first scanning lens 5a has a lens power P1, the second scanning lens 5b has a lens power P2, and both the scanning lenses meet the requirement: P1>P2. The use of the scanning lens device 5 that is constructed in this manner makes it possible to provide a small-size, increased-performance optical scanning device with low cost.

In the optical scanning device 10 of the present embodiment, the reflection surface 4a of the rotary deflector 4 has a radius of curvature in the main scanning direction, indicated by "R1" in FIG. 1. The reflection surface 4a is identified as the 1st surface of the optical scanning device 10. A first surface of the first scanning lens 5a has a radius of curvature in the main scanning direction, indicated by "R2", and a second surface of the first scanning lens 5a has a radius of curvature in the main scanning direction, indicated by "R3". The first and second surfaces of the first scanning lens 5a are identified as the 2nd and 3rd surfaces of the optical scanning device 10. A first surface of the second scanning lens 5b has a radius of curvature in the main scanning direction, indicated by "R4", and a second surface of the second scanning lens 5b has a radius of curvature in the main scanning direction, indicated by "R5". The first and second surfaces of the second scanning lens 5b are identified as the 4th and 5th surfaces of the optical scanning device 10.

Further, in the present embodiment, the scanning lens device 5 is configured such that the second surface (R3) of the first scanning lens 5a and the second surface (R5) of the second scanning lens 5b are concentric with respect to a reflection point P of the rotary deflector 4 where the converging light beam from the cylindrical lens 3 is reflected to the image surface 6. The use of the scanning lens device 5 having such concentric configuration makes it possible to stabilize the optical system performance and increase the tolerance range of machining errors or assembly errors for the optical scanning device. Namely, the ease of manufacture of the optical scanning device can be increased with the use of the scanning lens device 5 having the concentric configuration. When the scanning lens device 5 having the concentric configuration is provided in the optical scanning device 10, the scanning speed becomes relatively large as the beam spot approaches the outer peripheral end of the image surface in the main scanning direction, and it is necessary to obtain the uniform-velocity characteristics.

According to the optical scanning device 10 of the present embodiment, an electrical correction unit 9a is connected to the frequency dividing unit 9 that obtains the uniform-velocity characteristics. As described earlier, the scanning speed becomes relatively large as the beam spot approaches the outer peripheral end of the image surface 6 in the main scanning direction. When the beam spot is located adjacent to the center of the image surface 6 in the main scanning direction, the electrical correction unit 9 does not act to adjust the secondary frequency of the pixel clock at the output of the frequency dividing unit 9. When the beam spot is located at the outer peripheral end of the image surface 6 in the main scanning direction, the electrical correction unit 9a adjusts the secondary frequency of the pixel clock at the output of the frequency dividing unit 9 with respect to each of respective pixels included in the image signal, which will be described later.

Even when the electrical correction unit 9a is provided in the optical scanning device 10, it is necessary and desirable that at least one of the surfaces of the scanning lens device 5 be formed into a high-order aspherical surface. A second-order aspherical lens surface can be formed by using a mechanical grinding process. However, in order for mass production of high-order aspherical lens surfaces, the use of a molding process using a molding die is suitable. Usually, an injection molding process is used when the scanning lens is made of a thermoplastic resin material, and a filling molding process is used when the scanning lens is made of a thermosetting resin material. In addition, when the scanning lens is made of a low melting-point material, such as an optical glass, the glass surface is formed, in advance, into an approximated shape, and the glass surface is coated with an optical resin material, and the coated glass surface is formed into the desired configuration by using a molding process. The mass production of the scanning lens with low cost is possible.

In summary, the optical scanning device of the present embodiment is provided with the scanning lens device 5 that is configured such that the second surface (R3) of the first scanning lens 5a and the second surface (R5) of the second scanning lens 5b are concentric with respect to the reflection point P of the rotary deflector 4. Because of the concentric configuration, in the optical scanning device of the present embodiment, the excessive linearity is left, and it is necessary to correct it. In order to obtain the uniform-velocity characteristics, the electrical correction unit 9a is connected to the frequency dividing unit 9 in the present embodiment.

Preferably, the linearity "Lin", remaining in the optical scanning device of the present embodiment, satisfies the conditions: 0.5% ≦|Lin|≦10%. When the linearity "Lin" is around 0.1% as in the conventional optical scanning device, it is admitted that the optical scanning device provides good performance for the uniform-velocity characteristics.

In the present embodiment, when the linearity "Lin" is larger than the lower limit (0.5%) and smaller than the upper limit (10%), the excessive linearity can be easily corrected by using the electrical correction unit 9a. However, when the linearity is less than the lower limit, the electrical correction unit 9a is not effective in obtaining the uniform-velocity characteristics.

Moreover, when the linearity "Lin" is larger than the upper limit (10%), it is found that the deviation of the beam waist diameter at the peripheral image point from the target value becomes excessively large, and it is difficult to obtain the uniform-velocity characteristics even if the electrical correction unit 9a is used.

Figure 6:
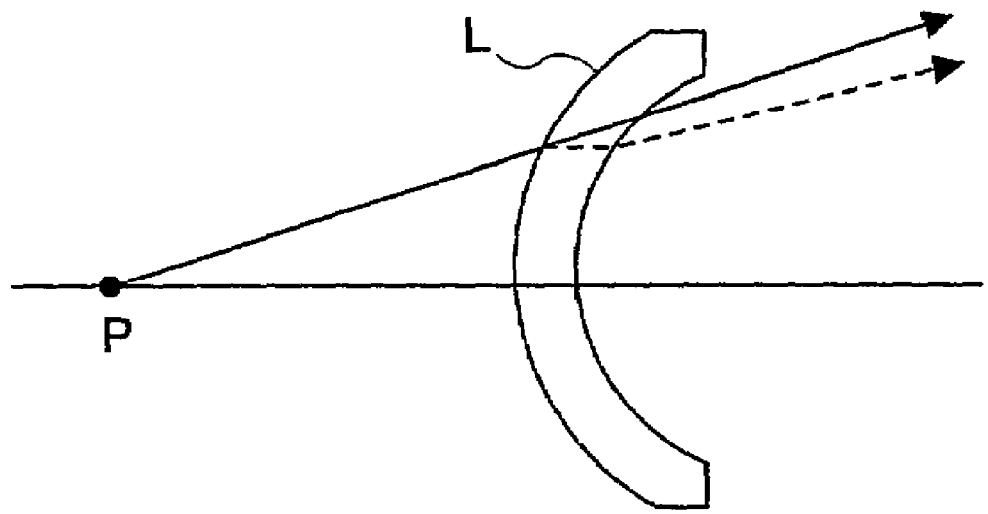
FIG. 6 is a diagram for explaining a conventional linearity correction method.

Specifically, in the optical scanning device shown in FIG. 1, the scanning lens device 5 is configured such that the linearity "Lin" is a positive value and satisfies the conditions: 0.5% ≦Lin≦10%, and that the second surface (R3) of the first scanning lens 5a and the second surface (R5) of the second scanning lens 5b are concentric with respect to the reflection point P of the rotary deflector 4. In order to obtain the uniform-velocity characteristics, the electrical correction unit 9a is provided in the present embodiment so that the electrical correction unit 9a adjusts the secondary frequency of the pixel clock of the frequency dividing unit 9 with respect to each of respective pixels included in the image signal. Hence, it is possible for the present embodiment to avoid the use of the meniscus lens "L", shown in FIG. 6, which has the non-concentric configuration and is detrimental to increasing the performance of the optical scanning device.

A description will be given of the specifications and characteristics of the optical scanning device 10 of the first preferred embodiment.

In the embodiment shown in FIG. 1, the reference wavelength of the laser light beam emitted by the light source 1 is 410 nm, and the angle between the optical axis of the coupling lens 2 and the optical axis of the scanning lens device 5 is 60 degrees. The rotary deflector 4 is constituted by a rotary deflector having five reflection surfaces, and one of the reflection surfaces is used as the reflection surface 4a during the rotation of the rotary deflector around the rotation axis 4b. The distance between the rotation axis 4b and the reflection surface 4a in the rotary deflector 4 is 20 mm. The rotation angle of the deflector 4 when the light beam from the light source 1 is directed along the optical axis of the scanning lens device 5 (or the reference line X) is 30 degrees. The scanning width Y of the optical scanning device 10 is ±150 mm, which corresponds to the width of an A3-size sheet.

In the scanning lens device 5 shown in FIG. 1, each of the first and second scanning lenses 5a and 5b is made of a polyolefin resin and formed by using a molding process. The scanning lens device 5 is configured such that the second surface (R3) of the first scanning lens 5a and the second surface (R5) of the second scanning lens 5b are concentric with respect to the reflection point P of the rotary deflector 4. The first surface (R2) of the first scanning lens 5a and the first surface (R4) of the second scanning lens 5b are non-concentric with respect to the reflection point P of the rotary deflector 4. The number of the concentric lens surfaces in the scanning lens device 5 is the same as the number of the non-concentric lens surfaces in the scanning lens device 5.

Further, in the embodiment shown in FIG. 1, all the lens surfaces of the scanning lens device 5 are formed into a high-order aspherical surface. The high-order aspherical surface of each of the lens surfaces of the scanning lens device 5 in the main-scanning cross-section is defined by the following formula.

$$X = \frac{CY^2}{1 + \sqrt{1-(1+K)C^2Y^2}} + M4Y^4 + M6Y^6 + M8Y^8 + M10Y^{10} + M12Y^{12} + M14Y^{14} + M16Y^{16}$$

wherein "X" indicates a coordinate of a point on the aspherical surface in the direction of the optical axis of the scanning lens device 5, "Y" indicates a coordinate of the point on the aspherical surface in the main scanning direction, "R" indicates a radius of curvature of the aspherical surface paraxial to the optical axis of the scanning lens device 5, "C" indicates an inverse number of "R", "K" indicates a "conical" coefficient, "M4", "M6", . . . , "M16" indicate high-order coefficients.

The high-order aspherical surface of each of the lens surfaces of the scanning lens device 5 in the sub-scanning cross-section is not related to the aspect of the present invention, and a description thereof will be omitted.

The following TABLE 1 provides specific values of the optical system parameters of the optical scanning device 10 of the first preferred embodiment.

TABLE 1

| First Preferred Embodiment (reference wavelength: 410 nm) | | | | | |
|---|---|---|---|---|---|
| I | R(I) | D(I) | N(I)d | N (I)410 | v(I)d |
| 1 | ∞ | 72 | | | |
| 2 | 2144.2 | 35 | 1.53046 | 1.54568 | 55.8 |
| 3 | −156.94 | 54.8 | | | |
| 4 | 977. | 14.4 | 1.53046 | 1.54568 | 55.8 |
| 5 | −1555. | | | | |

In the above TABLE 1, "I" indicates the surface number of the optical scanning device 10, "R(I)" indicates a radius of curvature of the I-th surface of the optical scanning device 10 in the main scanning direction, "D(I)" indicates a distance between the I-th surface and the (I+1)-th surface, "N(I)d" indicates a refractive index of the scanning lens between the I-th surface and the (I+1)-th surface (d-line), "N(I)410 " indicates a refractive index of the scanning lens between the I-th surface and the (I+1)-th surface (reference wavelength 410 nm), and "v(I)d" indicates an Abbe's number of the scanning lens between the I-th surface and the (I+1)-th surface (d-line).

The following TABLE 2 provides specific values of the conical coefficient K and high-order coefficients M4 through M16 of each of the high-order aspherical surfaces of the scanning lens device 5 of the first preferred embodiment.

TABLE 2

| First Preferred Embodiment | | | | | | | | |
|---|---|---|---|---|---|---|---|---|
| I | K | M4 | M6 | M8 | M10 | M12 | M14 | M16 |
| 2 | 533. | 5.42E−08 | 3.11E−12 | 3.49E−16 | −7.41E−21 | 3.85E−25 | | |
| 3 | −0.228 | 4.40E−08 | 6.69E−12 | 4.18E−16 | 6.08E−20 | 6.38E−25 | | |
| 4 | −181. | −9.73E−09 | 3.43E−13 | 7.87E−17 | 3.77E−21 | 1.21E−25 | 1.08E−29 | 9.04E−36 |
| 5 | 34.1 | −2.17E−08 | 1.25E−12 | 3.17E−17 | 3.45E−21 | 2.49E−25 | 1.58E−29 | −7.40E−36 |

In the above TABLE 2, the specific values of the high-order coefficients related to each aspherical surface are given by using a scientific notation. For example, the scientific notation "5.42E-08", given to the high-order coefficient M4 of the 2nd surface, represents the product of the decimal fraction number 5.42 and $10^{-8}$.

Figure 2A:
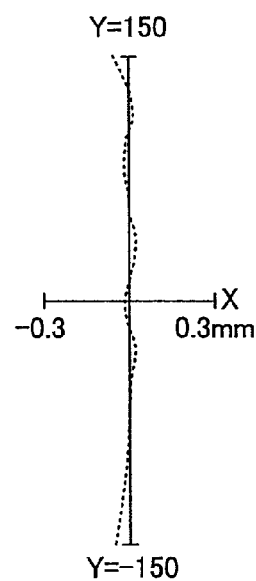
FIG. 2A and FIG. 2B are diagrams for explaining main-scanning field curvature and linearity characteristics of the optical scanning device of the present embodiment.
Figure 2B:
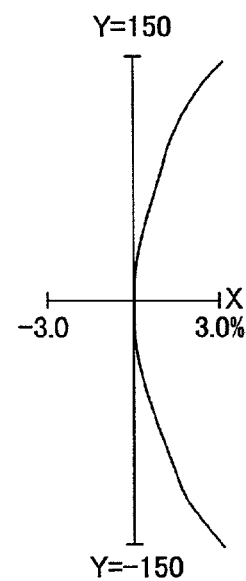

FIG. 2A shows the main-scanning field curvature of the optical scanning device 10 of FIG. 1. FIG. 2B shows the linearity of the optical scanning device 10 of FIG. 1. As shown in FIG. 2A, the main-scanning field curvature of the optical scanning device 10 is about 0.097 mm at the maximum. As shown in FIG. 2B, the linearity at the outer peripheral end of the image surface is about +3.5%. It is found that the optical scanning device 10 provides good performance for the wavefront aberration.

In the optical scanning device 10 of the present embodiment, when the beam spot is located near the center of the image surface 6 in the main scanning direction, the pixel clock generating unit 8 generates the pixel clock at the initial frequency. As shown in FIG. 2B, the linearity "Lin" at the center of the image surface 6 is nearly equal to zero. The frequency dividing unit 9 generates the secondary frequency of the pixel clock at its output, which is equal to the initial frequency of the pixel clock at its input divided by eight (the divisor integer=8). The pixel clock output from the frequency dividing unit 9 is supplied to the laser writing unit 7 concurrently with the image signal. The laser writing unit 7 controls the light source 1 (the laser diode) so that the light source 1 is turned on and off in accordance with the image signal based on the secondary frequency of the pixel clock at the output of the frequency dividing unit 9. Hence, the light source 1 emits the laser light beam based on the secondary frequency. In this condition, the electrical correction unit 9 does not act to adjust the secondary frequency of the pixel clock at the output of the frequency dividing unit 9. Namely, the secondary frequency, which is the frequency at which the ON/OFF state of the light source 1 is controlled by the optical writing unit 7, is set at one-eighth of the initial frequency of the pixel clock generating unit 8.

On the other hand, when the beam spot is located near the outer peripheral end of the image surface 6 in the main scanning direction, the electrical correction unit 9a adjusts the secondary frequency of the pixel clock at the output of the frequency dividing unit 9 with respect to each of respective pixels included in the image signal. As shown in FIG. 2B, the linearity "Lin" at the outer peripheral end of the image surface 6 is increased to 3.5%. In this condition, Lin=3.5%=3.5/100≈2/56=2/(8×7). Specifically, the electrical correction unit 9a controls the frequency dividing unit 9 such that the secondary frequency of the pixel clock at the output of the frequency dividing unit 9 is set at one seventh of the initial frequency of the pixel clock generating unit 8 (i.e., the division divisor integer is seven) at the rate of 2:7 (i.e., at the rate of two for every seven pixel clocks), and the secondary frequency is set at one eighth of the initial frequency (i.e., the divisor integer is eight) at the rate of 5:7 (i.e., at the rate of five for every seven pixel clocks).

According to the optical scanning device of the above-described embodiment, it is possible to provide good performance for the optical characteristics by using the electrical correction unit 9a that obtains the uniform-velocity characteristics with the use of a certain amount of the linearity at the outer peripheral end of the image surface 6.

Figure 3:
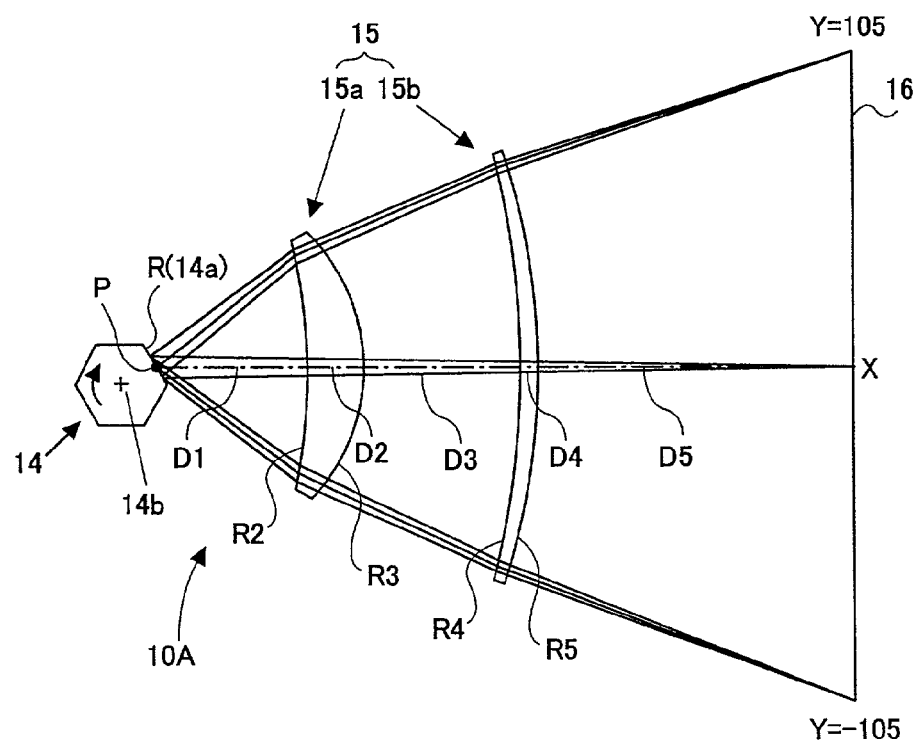
FIG. 3 is a cross-sectional view of a main part of a second preferred embodiment of the optical scanning device of the invention taken along a main-scanning cross-section thereof.

Next, FIG. 3 shows a main part of a second preferred embodiment of the optical scanning device of the invention taken along a main-scanning cross-section thereof.

In FIG. 3, the light source 1, the coupling lens 2, the cylindrical lens 3, the laser writing unit 7, the pixel clock generating unit 8, the frequency dividing unit 9 and the electrical correction unit 9a in the optical scanning device 10A of the present embodiment, which are essentially the same as corresponding elements in the previous embodiment of FIG. 1, are omitted and only the other elements of the optical scanning device 10A of the present embodiment are shown, for the sake of simplicity of illustration.

In the optical scanning device 10A of FIG. 3, the converging beam from the cylindrical lens is reflected to a rotary deflector 14 such that the reflected converging beam forms a longitudinal line image on a reflection surface 14a of the rotary deflector 14, the line image extending in the main scanning direction. The rotary deflector 14 is rotated clockwise around a rotation axis 14b as indicated by the arrow in FIG. 3, and the light beam, reflected on the reflection surface 14a of the rotary deflector 14, is deflected at a constant angular velocity. The light beam from the rotary deflector 14 is passed through a scanning lens device 15 to an image surface 16 of a photoconductor (not shown).

Hereinafter, the optical system that includes the coupling lens 2, the cylindrical lens 3, the rotary deflector 14 and the scanning lens device 15, provided within the optical scanning device 10A, is called a scanning optical system.

The scanning optical system, including the scanning lens device 15, scans the image surface 16 in the main scanning direction at a generally uniform velocity by focusing the deflected light beam from the rotary deflector 14 onto the image surface 16 as a beam spot. Hence, in the optical scanning device 10A of the present embodiment, the image surface 16 is scanned along the main scanning line in the main scanning direction by applying the beam spot created by the scanning optical system.

The scanning lens device 15 includes a first scanning lens 15a that is a positive lens and a second scanning lens 15b that is a positive lens. A refractive lens power of the scanning lens device 5 is allocated to the two positive lenses 15a and 15b. In the present embodiment, the scanning lens device 15 is configured such that the first and second surfaces (R2, R3) of the first scanning lens 15a and the first and second surfaces (R4, R5) of the second scanning lens 15b are concentric with respect to a reflection point P of the rotary deflector 14 where the converging light beam from the cylindrical lens is reflected to the image surface 16. There is no non-concentric lens surface in the scanning lens device 15. The use of the scanning lens device 15 having such concentric configuration makes it possible to stabilize the optical system performance and increase the tolerance range of machining errors or assembly errors for the optical scanning device. Namely, the ease of manufacture of the optical scanning device can be increased with the use of the scanning lens device 15 having the concentric configuration. When the scanning lens device 15 having the concentric configuration is provided in the optical scanning device 10A, the scanning speed becomes relatively large as the beam spot approaches the outer peripheral end of the image surface 16 in the main scanning direction, and it is necessary to obtain the uniform-velocity characteristics. Similar to the previous embodiment of FIG. 1, the electrical correction unit 9a is provided in the optical scanning device 10A for this purpose, which will be described later.

The following TABLE 3 provides specific values of the optical system parameters of the optical scanning device 10A of the second preferred embodiment.

TABLE 3

Second Preferred Embodiment (reference wavelength: 650 nm)

| I | R(I) | D(I) | N(I)d | N (I)650 | v(I)d |
|---|------|------|-------|----------|-------|
| 1 | ∞ | 49.5 | | | |
| 2 | −194.5 | 18 | 1.53046 | 1.52787 | 55.8 |
| 3 | −58.2 | 52 | | | |
| 4 | −660. | 4.5 | 1.53046 | 1.52787 | 55.8 |
| 5 | −330. | | | | |

In the above TABLE 3, the notation is the same as that of the TABLE 1, and a description thereof will be omitted.

The following TABLE 4 provides specific values of the conical coefficient K and high-order coefficients M4 through M10 of each of the high-order aspherical surfaces of the scanning lens device 15 of the second preferred embodiment.

TABLE 4

Second Preferred Embodiment

| I | K | M4 | M6 | M8 | M10 |
|---|---|----|----|----|-----|
| 2 | −3.87 | 1.31E−07 | −3.65E−12 | −2.47E−13 | 5.61E−17 |
| 3 | −0.07 | 5.70E−07 | −2.64E−11 | 5.13E−15 | −4.33E−19 |
| 4 | −30. | −1.16E−07 | −1.10E−11 | −1.26E−15 | 1.90E−19 |
| 5 | −90. | −2.31E−07 | −7.21E−12 | −4.62E−16 | −5.33E−20 |

In the above TABLE 4, the notation is the same as that of the TABLE 2 in the previous embodiment, and a description thereof will be omitted.

A description will be given of the specifications and characteristics of the optical scanning device 10A of the second preferred embodiment. However, the description of the present embodiment in FIG. 3 that are essentially the same as that of the previous embodiment in FIG. 1 will be omitted, and only the description of the present embodiment in FIG. 3 that is different from that of the previous embodiment in FIG. 1 will now be provided.

In the optical scanning device 10A shown in FIG. 3, the reference wavelength of the laser light beam emitted by the light source is 650 nm. The rotary deflector 14 is constituted by a rotary deflector having six reflection surfaces, and one of the reflection surfaces is used as the reflection surface 14a during the rotation of the rotary deflector 14 around the rotation axis 14b. The distance between the rotation axis 14b and the reflection surface 14a in the rotary deflector 14 is 18 mm. The rotation angle of the deflector 14 when the light beam from the light source is directed along the optical axis of the scanning lens device 15 (or the reference line X) is 30 degrees. The scanning width Y of the optical scanning device 10A is ±105 mm, which corresponds to the width of an A4-size sheet. In the above TABLE 3, "N(I)650" indicates a refractive index of the scanning lens between the I-th surface and the (I+1)-th surface (reference wavelength 650 nm).

Figure 4A:
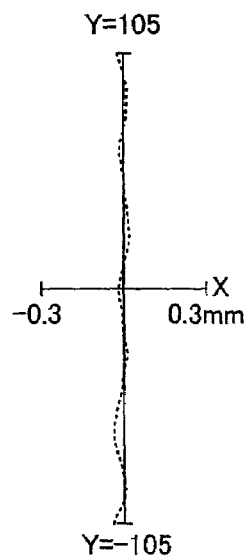
FIG. 4A and FIG. 4B are diagrams for explaining main-scanning field curvature and linearity characteristics of the optical scanning device of the present embodiment.
Figure 4B:
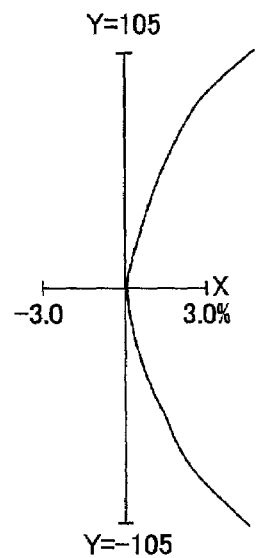

FIG. 4A shows the main-scanning field curvature of the optical scanning device 10A of FIG. 3. FIG. 4B shows the linearity of the optical scanning device 10A of FIG. 3. As shown in FIG. 4A, the main-scanning field curvature of the optical scanning device 10A is about 0.057 mm at the maximum. As shown in FIG. 4B, the linearity at the outer peripheral end of the image surface is about +5.0%. It is found that the optical scanning device 10A provides good performance for the wavefront aberration.

In the optical scanning device 10A of the present embodiment, when the beam spot is located near the center of the image surface 16 in the main scanning direction, the pixel clock generating unit 8 generates the pixel clock at the initial frequency. As shown in FIG. 4B, the linearity "Lin" at the center of the image surface 6 is nearly equal to zero. The frequency dividing unit 9 generates the secondary frequency of the pixel clock at its output, which is equal to the initial frequency of the pixel clock at its input divided by eight (the divisor integer=8). The pixel clock output from the frequency dividing unit 9 is supplied to the laser writing unit 7 concurrently with the image signal. The laser writing unit 7 controls the light source (the laser diode) so that the light source is turned on and off in accordance with the image signal based on the secondary frequency of the pixel clock at the output of the frequency dividing unit 9, so that the light source emits the laser light beam based on the secondary frequency. In this condition, the electrical correction unit 9 does not act to adjust the secondary frequency of the pixel clock at the output of the frequency dividing unit 9, similar to that of the previous embodiment of FIG. 1. Namely, the secondary frequency, which is the frequency at which the ON/OFF state of the light source is controlled by the optical writing unit 7, is set at one-eighth of the initial frequency of the pixel clock generating unit 8.

On the other hand, when the beam spot is located near the outer peripheral end of the image surface 16 in the main scanning direction, the electrical correction unit 9a adjusts the secondary frequency of the pixel clock at the output of the frequency dividing unit 9 with respect to each of respective pixels included in the image signal. As shown in FIG. 4B, the linearity "Lin" at the outer peripheral end of the image surface 6 is increased to 5.0%. In this condition, Lin=5.0%=5/100=2/40=2/(8×5). Namely, when the beam spot is located near the outer peripheral end of the image surface, the electrical correction unit 9 a controls the frequency dividing unit 9 such that the secondary frequency of the pixel clock at the output of the frequency dividing unit 9 is set at one seventh of the initial frequency of the pixel clock generating unit 8 (i.e., the divisor integer is seven) at the rate of 2:5, and the secondary frequency is set at one eighth of the initial frequency (i.e., the divisor integer is eight) at the rate of 3:5.

According to the optical scanning device of the above-described embodiment, it is possible to provide good performance for the optical characteristics by using the electrical correction unit 9a that obtains the uniform-velocity characteristics with the use of the remaining linearity at the outer peripheral end of the image surface 16.

Figure 5:
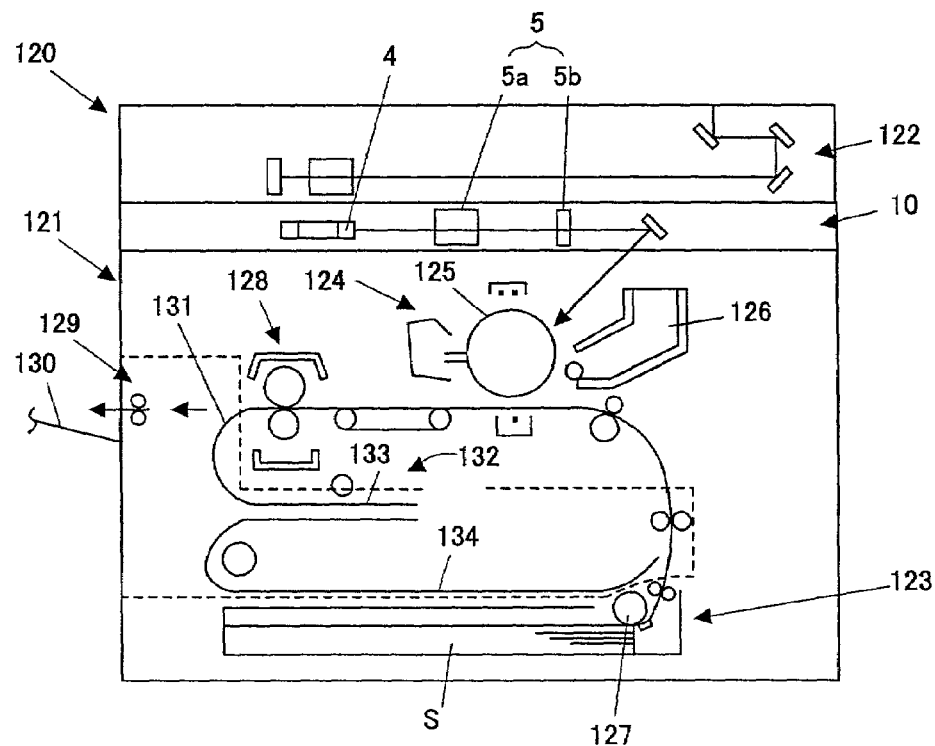
FIG. 5 is a diagram of an image forming system in which one embodiment of the optical scanning device of the invention is provided.

FIG. 5 shows an image forming system in which one embodiment of the optical scanning device of the invention is provided.

As shown in FIG. 5, the image forming system of the present embodiment is a digital copier 120. The digital copier 120 includes a main body 121, and an optical reading device 122 is provided within the main body 121. The optical scanning device 10 of the present invention is also provided within the main body 121. The optical scanning device 10 scans an image surface of a photoconductor 125 by an imaging pattern of the laser light beam based on image data that is generated from an original image by the optical reading device 122.

In the digital copier 120 of FIG. 5, the photoconductor 125 is provided in an image forming device 124. The photoconductor 125 is rotated about its rotation axis, and the image surface of the photoconductor 125 is moved relative to the optical scanning device 10, at a rate synchronized with the rotation speed of the rotary deflector 4, in the sub-scanning direction perpendicular to the main scanning direction. The surface of the photoconductor 125 is electrostatically charged. When the image surface of the photoconductor 125 is subjected to the optical scanning by the optical scanning device 10, an electrostatic latent image is formed on the image surface of the photoconductor 125. The latent image is visualized into a toned image by a developing device 126 using electrostatically-charged toner particles.

The toned image is electrostatically transferred from the photoconductor 125 to a recording sheet S. A sheet supplying device 123 containing recording sheets is provided at a lower position of the main body 121. A sheet feeding roller 127 is provided at an end portion of the sheet supplying device 123, and, by controlling the sheet feeding roller 127, the recording sheet S is sent from the sheet supplying device 123 to the photoconductor 125 one after another.

After the image transferring is performed, the recording sheet S is sent to a fixing device 128, and the toner is thermally fused to the recording sheet S at the fixing device 128. A pair of ejection rollers 129 is provided at the output of the fixing device 128, and the recording sheet S is sent to an external ejection tray 130 by the ejection rollers 129. Hence, the image forming system 120 forms the image on the recording sheet S.

When the digital copier 120 operates in a dual-copy mode, the recording sheet S from a reverse transport path 131 is transported to a dual-copy tray 133 of a dual-copy device 132. In the dual-copy device 132, the recording sheet S is turned upside down, and the recording sheet S from the dual-copy device 132 is transported to the image forming device 124 via a dual-copy transport path 134. The image forming process is performed again on the back surface of the recording sheet S at the image forming device 124. Then, the recording sheet S passes through the fixing device 128 and is ejected to the ejection tray 130.

The image forming system in which the optical scanning device of the present invention is provided is not limited to the above-described embodiment. The optical scanning device of the present invention is applicable to another image forming system such as a facsimile or a printer.

Next, a description will be given of a third preferred embodiment of the optical scanning device of the invention.

The image surface characteristics of the optical scanning device include the beam spot depth and the beam waste diameter. In the case of an optical scanning device that provides good performance for the wavefront aberration and the linearity, the beam waste diameter in the main scanning direction is maintained at a generally constant level but the beam spot depth in the main scanning direction becomes relatively small as the beam spot approaches the outer peripheral end of the image surface in the main scanning direction. In the case of the optical scanning device of the present invention that provides good performance for the wavefront aberration and contains a certain amount of the linearity, variations of the beam waste diameter in the main scanning direction may take place. The linearity is a kind of representation of distortion aberration, and it can be assumed that the linearity varies depending on the 3rd or higher order power of the field angle. Based on the above-mentioned aspect, the optical scanning device of the present embodiment is configured to provide good performance for the optical characteristics by using the correction of the linearity around the outer peripheral end of the image surface in the main scanning direction in addition to the use of the electrical correction unit that obtains the uniform-velocity characteristics.

Figure 7:
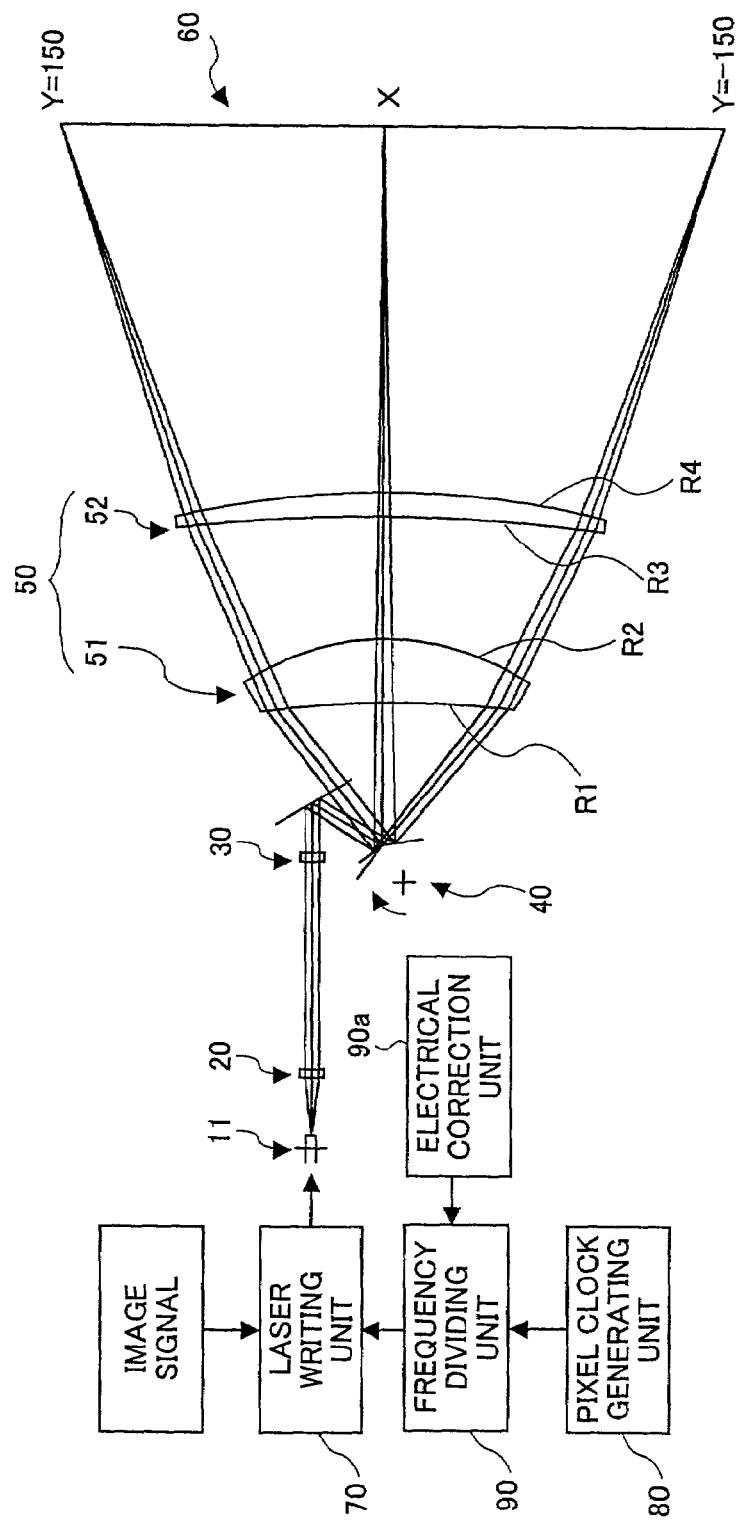
FIG. 7 is a diagram of a third preferred embodiment of the optical scanning device of the invention.

FIG. 7 shows the third preferred embodiment of the optical scanning device of the invention. As shown in FIG. 7, a coupling lens 20 couples a light beam emitted by a light source 11 (laser diode), and provides a cylindrical lens 30 with the coupled beam. The cylindrical lens 30 converts the coupled beam from the coupling lens 20 into a converging beam. The converging beam from the cylindrical lens 30 is reflected to a rotary deflector 40 by a mirror such that the reflected converging beam forms a longitudinal line image on a reflection surface of the rotary deflector 40, the line image extending in the main scanning direction. The rotary deflector 40 is rotated clockwise around its rotation axis as indicated by the arrow in FIG. 7. The light beam, reflected on the reflection surface of the deflector 40 is deflected at a constant angular velocity. The light beam from the rotary deflector 40 is passed through a scanning lens device 50 to an image surface 60 of a photoconductor (not shown).

Hereinafter, the optical system that includes the coupling lens 20, the cylindrical lens 30, the rotary deflector 40 and the scanning lens device 50, provided within the optical scanning device of the present embodiment, is called a scanning optical system.

The scanning optical system, including the scanning lens device 50, scans the image surface 60 in the main scanning direction at a generally uniform velocity by focusing the deflected light beam from the rotary deflector 40 onto the image surface 60 as a beam spot. Hence, in the optical scanning device of the present embodiment, the image surface 60 is scanned along the main scanning line in the main scanning direction by applying the beam spot created by the scanning optical system.

Further, in the optical scanning device of FIG. 7, a laser writing unit 70, a pixel clock generating unit 80, a frequency dividing unit 90 and an electrical correction unit 90a, which are essentially the same as corresponding elements in the previous embodiment of FIG. 1, are provided, and a description thereof will be omitted.

The scanning lens device 50 includes a first scanning lens 51 that is a positive lens and a second scanning lens 52 that is a positive lens. A refractive lens power of the scanning lens device 50 is allocated to the two positive lenses. In the present embodiment, the scanning lens device 50 is configured such that the first and second surfaces (R2, R3) of the first scanning lens 15a and the first and second surfaces (R4, R5) of the second scanning lens 15b are concentric with respect to the reflection point of the rotary deflector 40 where the converging light beam from the cylindrical lens is reflected to the image surface 60. There is no non-concentric lens surface in the scanning lens device 50. The use of the scanning lens device 50 having such concentric configuration makes it possible to stabilize the optical system performance and increase the tolerance range of machining errors or assembly errors for the optical scanning device. Namely, the ease of manufacture of the optical scanning device can be increased with the use of the scanning lens device 50 having the concentric configuration. When the scanning lens device 50 having the concentric configuration is provided in the optical scanning device, the scanning speed becomes relatively large as the beam spot approaches the outer peripheral end of the image surface 60 in the main scanning direction, and it is necessary to obtain the uniform-velocity characteristics. Similar to the previous embodiment of FIG. 1, the electrical correction unit 90a is provided in the optical scanning device of the present embodiment for this purpose, which will be described later.

In the embodiment shown in FIG. 7, the reference wavelength of the laser light beam emitted by the light source 11 is 408 nm, and the angle between the optical axis of the coupling lens 20 and the optical axis of the scanning lens device 50 is 60 degrees. The rotary deflector 40 is constituted by a rotary deflector having five reflection surfaces, and one of the reflection surfaces is used as the reflection surface during the rotation of the rotary deflector 40 around the rotation axis. The distance between the rotation axis and the reflection surface in the rotary deflector 40 is 18 mm. The rotation angle of the deflector 4 when the light beam from the light source 11 is directed along the optical axis of the scanning lens device 50 (or the reference line X) is 30 degrees. The scanning width Y of the optical scanning device of the present embodiment is ±150 mm, which corresponds to the width of an A3-size sheet.

In the scanning lens device 50 shown in FIG. 7, each of the first and second scanning lenses 51 and 52 is made of a polyolefin resin and formed by using a molding process. The number of the concentric lens surfaces in the scanning lens device 50 is larger than the number of the non-concentric lens surfaces in the scanning lens device 50.

Further, in the embodiment shown in FIG. 7, all the lens surfaces of the scanning lens device 50 are formed into a high-order aspherical surface. The high-order aspherical surface of each of the lens surfaces of the scanning lens device 50 in the main-scanning cross-section is defined by the formula which is the same as that given in the previous embodiment of FIG. 1. The high-order aspherical surface of each of the lens surfaces of the scanning lens device 50 in the sub-scanning cross-section is not related to the aspect of the present invention, and a description thereof will be omitted.

The following provides specific values of the optical system parameters of the optical scanning device of the third preferred embodiment:

The distance between the reflection point of the deflector 40 and the first surface (R1) of the first scanning lens 51 is 64.9 mm.

The first surface (R1) of the first scanning lens 51:

| R | −835.5 |
|---|---|
| K | 0. |
| M4 | 2.19E-08 |
| M6 | −3.60E-12 |
| M8 | −3.52E-16 |
| M10 | −2.52E-20 |
| M12 | 2.29E-24 |

(wherein "R" indicates a radius of curvature of the aspherical surface paraxial to the optical axis of the scanning lens device 50, "K" indicates a "conical" coefficient, and "M4", "M6", . . . , "M12" indicate high-order coefficients.)

The second surface (R2) of the first scanning lens 51:

| R | −120.18 |
|---|---|
| K | −2.54 |
| M4 | −1.51E-07 |
| M6 | 3.40E-12 |
| M8 | −2.69E-16 |
| M10 | −4.07E-20 |
| M12 | −7.56E-24 |

The thickness of the first scanning lens 51 across the optical axis is 30 mm.

The distance between the first scanning lens 51 and the second scanning lens 52 is 55.8 mm.

The first surface (R3) of the second scanning lens 52:

| R | −5000.0 |
|---|---|
| K | 0.0 |
| M4 | −3.07E-08 |
| M6 | −1.29E-13 |
| M8 | −8.70E-18 |
| M10 | −1.13E-21 |
| M12 | −4.58E-26 |
| M14 | 1.13E-30 |
| M16 | −1.94E-34 |

The second surface (R4) of the second scanning lens 52:

| R | −600.4 |
|---|---|
| K | −6.79 |
| M4 | −3.86E-08 |
| M6 | −1.16E-13 |
| M8 | −4.20E-17 |
| M10 | 1.50E-22 |
| M12 | −8.83E-26 |
| M14 | 4.97E-30 |
| M16 | −3.72E-34 |

The thickness of the second scanning lens 52 across the optical axis is 12 mm.

The distance between the second surface (R4) of the second scanning lens 52 and the image surface 60 is 167.5 mm.

The refractive index "Nd" of each of the scanning lens 51 and 52 (d-line) is 1.53046.

The refractive index "N408" of each of the scanning lens 51 and 52 (reference wavelength=408 nm) is 1.54598.

The Abbe's number "vd" of each of the scanning lens 51 and 52 (d-line) is 55.8.

Figure 8:
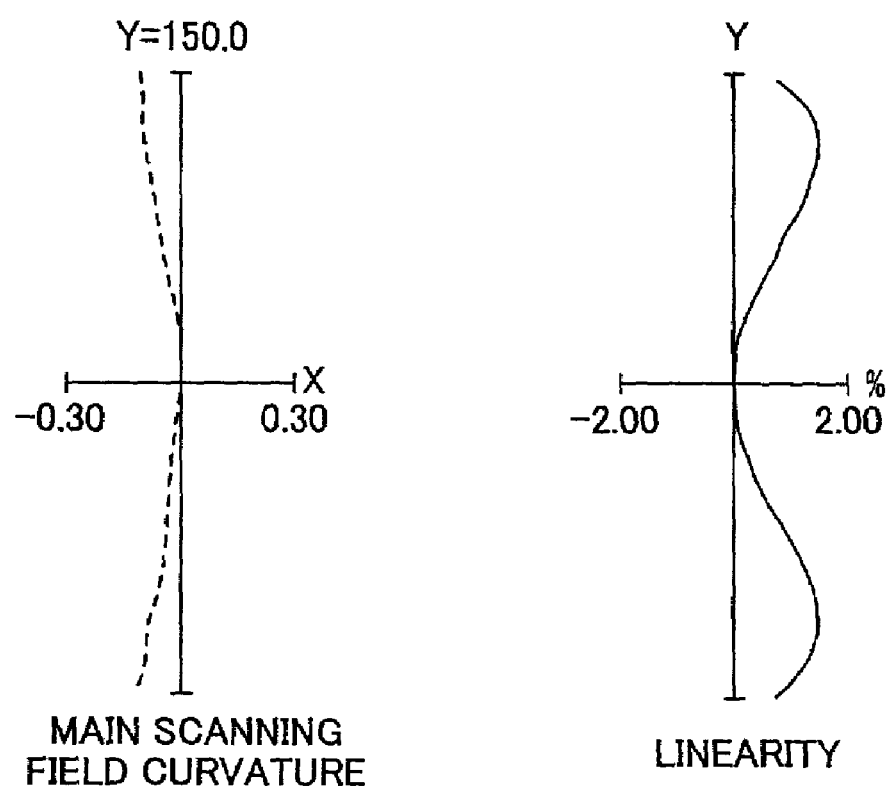
FIG. 8A and FIG. 8B are diagrams for explaining main-scanning field curvature and linearity characteristics of the optical scanning device of the present embodiment.

FIG. 8A and FIG. 8B show the main-scanning field curvature and linearity characteristics of the optical scanning device of FIG. 7.

As shown in FIG. 8B, the maximum amount of linearity (Lm) over the entire image surface 60 (around the point corresponding to the image height Y=±110 mm) is about +1.7%, and the amount of linearity (Le) at the outer peripheral end of the image surface (corresponding to the image height Y=150 mm) is about +0.9%.

Figures 9A, 9B:
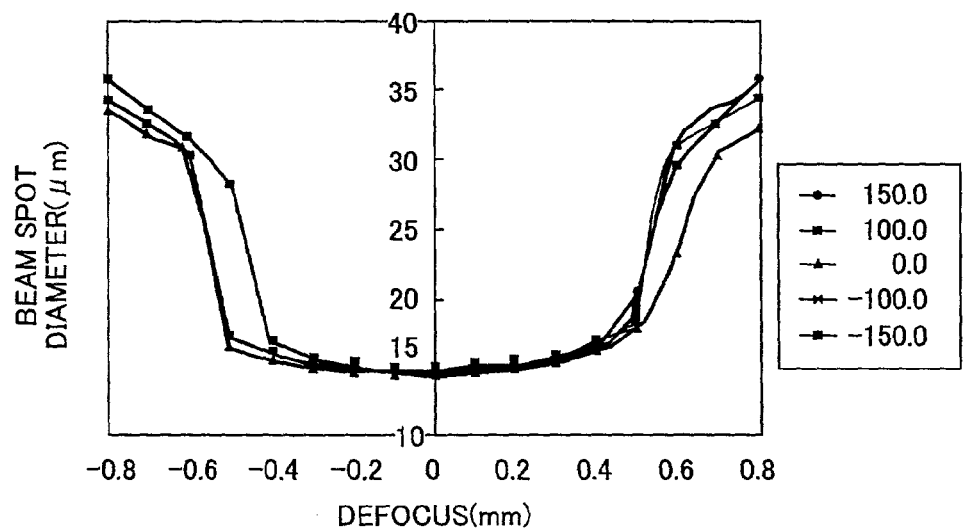
FIG. 9A and FIG. 9B are diagrams for explaining beam-spot diameter characteristics of the optical scanning device of the present embodiment in the main-scanning direction.

FIG. 9A and FIG. 9B show the beam-spot diameter characteristics of the optical scanning device of FIG. 7 in the main-scanning direction. Although small variations of the beam waste diameter due to the changes of the linearity take place, the magnitude of the changes of the beam waste diameter is sufficiently small, and the influence on the beam spot density at the outer peripheral end of the image surface is negligible. The beam spot diameter over the entire image surface is maintained at a generally constant level that is about 15 μm, and variations of the beam spot diameter which are negligible.

In the optical scanning device of the present embodiment, when the beam spot is located near the center of the image surface 60 in the main scanning direction, the pixel clock generating unit 80 generates the pixel clock at the initial frequency. As shown in FIG. 8B, the linearity at the center of the image surface 60 is nearly equal to zero. The frequency dividing unit 90 generates the secondary frequency of the pixel clock at its output, which is equal to the initial frequency of the pixel clock at its input divided by eight (the divisor integer=8). The pixel clock output from the frequency dividing unit 90 is supplied to the laser writing unit 70 concurrently with the image signal. The laser writing unit 70 controls the light source 11 (the laser diode) so that the light source 11 is turned on and off in accordance with the image signal based on the secondary frequency of the pixel clock at the output of the frequency dividing unit 90. Hence, the light source 11 emits the laser light beam based on the secondary frequency. In this condition, the electrical correction unit 90a does not act to adjust the secondary frequency of the pixel clock at the output of the frequency dividing unit 90. Namely, the secondary frequency, which is the frequency at which the ON/OFF state of the light source 1 is controlled by the optical writing unit 70, is set at one-eighth of the initial frequency of the pixel clock generating unit 80.

When the beam spot is located near the maximum-linearity point of the image surface 60 (image height Y=±110 mm), the electrical correction unit 90a adjusts the secondary frequency of the pixel clock at the output of the frequency dividing unit 90 with respect to each of respective pixels included in the image signal. As shown in FIG. 8B, the linearity at the maximum-linearity point of the image surface 60 (image height Y=±110 mm) is set at about 1.7%. In this condition, L=1.7%=1.7/100≈1/56=1/(8×7). Specifically, the electrical correction unit 90a controls the frequency dividing unit 90 such that the secondary frequency of the pixel clock at the output of the frequency dividing unit 90 is set at one seventh of the initial frequency of the pixel clock generating unit 80 (i.e., the divisor integer is seven) at the rate of 1:7, and the secondary frequency is set at one eighth of the initial frequency (i.e., the divisor integer is eight) at the rate of 6:7.

When the beam spot is located near the outer peripheral end of the image surface 60 in the main scanning direction (image height Y=±150 mm), the electrical correction unit 90a adjusts the secondary frequency of the pixel clock at the output of the frequency dividing unit 90 with respect to each of respective pixels included in the image signal. As shown in FIG. 8B, the linearity at the outer peripheral end of the image surface 6 (image height Y=±150 mm) is set at about 0.9%. In this condition, L=0.9%=0.9/100≈1/112=1/(8×14). Specifically, the electrical correction unit 90a controls the frequency dividing unit 90 such that the secondary frequency of the pixel clock at the output of the frequency dividing unit 90 is set at one seventh of the initial frequency of the pixel clock generating unit 80 (i.e., the division divisor integer is seven) at the rate of 1:14, and the secondary frequency is set at one eighth of the initial frequency (i.e., the divisor integer is eight) at the rate of 13:14.

According to the optical scanning device of the above-described embodiment, it is possible to provide good performance for the optical characteristics by using the electrical correction unit 90a that obtains the uniform-velocity characteristics with the use of a certain amount of the linearity at the outer peripheral end or the maximum-linearity point of the image surface 60.

Figure 10:
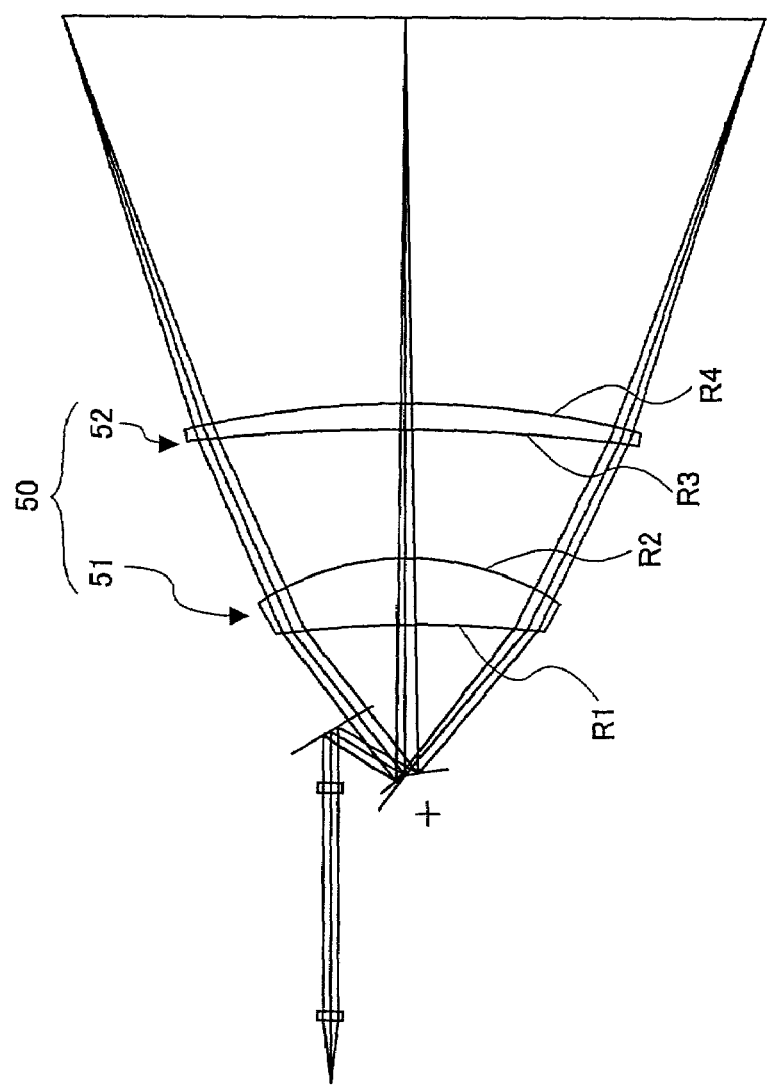
FIG. 10 is a diagram of a main part of a fourth preferred embodiment of the optical scanning device of the present invention.

Next, FIG. 10 shows a main part of a fourth preferred embodiment of the optical scanning device of the present invention.

In FIG. 10, the light source 11, the coupling lens 20, the cylindrical lens 30, the rotary deflector 40, the laser writing unit 70, the pixel clock generating unit 80, the frequency dividing unit 90 and the electrical correction unit 90a in the optical scanning device of the present embodiment, which are essentially the same as corresponding elements in the previous embodiment of FIG. 7, are omitted and only the scanning lens device 50 of the optical scanning device of the present embodiment are shown, for the sake of simplicity of illustration.

As shown in FIG. 10, the light beam, reflected on the reflection surface of the rotary deflector, is deflected at a constant angular velocity, and the deflected light beam from the rotary deflector is passed through the scanning lens device 50 to the image surface of a photoconductor (not shown). Hereinafter, the optical system that includes the coupling lens 20, the cylindrical lens 30, the rotary deflector 40 and the scanning lens device 50, provided in the optical scanning device of the present embodiment, is called a scanning optical system.

In the embodiment shown in FIG. 10, the reference wavelength of the laser light beam emitted by the light source 11 is 408 nm, and the angle between the optical axis of the coupling lens 20 and the optical axis of the scanning lens device 50 is 60 degrees. The rotary deflector 40 is constituted by a rotary deflector having five reflection surfaces, and one of the reflection surfaces is used as the reflection surface during the rotation of the rotary deflector 40 around the rotation axis. The distance between the rotation axis and the reflection surface in the rotary deflector 40 is 18 mm. The rotation angle of the deflector 4 when the light beam from the light source 11 is directed along the optical axis of the scanning lens device 50 (or the reference line X) is 30 degrees. The scanning width Y of the optical scanning device of the present embodiment is ±150 mm, which corresponds to the width of an A3-size sheet.

In the scanning lens device 50 shown in FIG. 10, each of the first and second scanning lenses 51 and 52 is made of a polyolefin resin and formed by using a molding process. The number of the concentric lens surfaces in the scanning lens device 50 is larger than the number of the non-concentric lens surfaces in the scanning lens device 50.

Further, in the embodiment shown in FIG. 10, all the lens surfaces of the scanning lens device 50 are formed into a high-order aspherical surface. The high-order aspherical surface of each of the lens surfaces of the scanning lens device 50 in the main-scanning cross-section is defined by the formula which is the same as that given in the previous embodiment of FIG. 1. The high-order aspherical surface of each of the lens surfaces of the scanning lens device 50 in the sub-scanning cross-section is not related to the aspect of the present invention, and a description thereof will be omitted.

The following provides specific values of the optical system parameters of the optical scanning device of the fourth preferred embodiment:

The distance between the reflection point of the deflector 40 and the first surface (R1) of the first scanning lens 51 is 65.1 mm.

The first surface (R1) of the first scanning lens 51:

| | |
|---|---|
| R | −870.3 |
| K | 0. |
| M4 | −1.69E-10 |
| M6 | −6.58E-12 |
| M8 | −8.14E-16 |
| M10 | −5.03E-20 |
| M12 | 8.58E-24 |

(wherein "R" indicates a radius of curvature of the aspherical surface paraxial to the optical axis of the scanning lens device 50, "K" indicates a "conical" coefficient, and "M4", "M6", . . . , "M12" indicate high-order coefficients.)

The second surface (R2) of the first scanning lens 51:

| | |
|---|---|
| R | −124.47 |
| K | −2.70 |
| M4 | −1.91E-07 |
| M6 | 2.07E-12 |
| M8 | −6.95E-16 |
| M10 | −1.01E-19 |
| M12 | −1.65E-23 |

The thickness of the first scanning lens 51 across the optical axis is 29.8 mm.

The distance between the first scanning lens 51 and the second scanning lens 52 is 54.2 mm.

The first surface (R3) of the second scanning lens 52:

| | |
|---|---|
| R | −263.7 |
| K | 0.0 |
| M4 | 7.80E-09 |
| M6 | 5.74E-13 |
| M8 | −5.64E-18 |
| M10 | −2.21E-21 |
| M12 | 6.33E-26 |
| M14 | −6.66E-30 |
| M16 | −1.43E-34 |

The second surface (R4) of the second scanning lens 52:

| | |
|---|---|
| R | −430.5 |
| K | −32.8 |
| M4 | 1.32E-10 |
| M6 | 4.39E-13 |
| M8 | −2.49E-17 |
| M10 | −3.56E-22 |
| M12 | −4.16E-26 |
| M14 | −6.25E-30 |
| M16 | −2.42E-35 |

The thickness of the second scanning lens 52 across the optical axis is 11 mm.

The distance between the second surface (R4) of the second scanning lens 52 and the image surface 60 is 170.0 mm.

The refractive index "Nd" of each of the scanning lens 51 and 52 (d-line) is 1.53046.

The refractive index "N408" of each of the scanning lens 51 and 52 (reference wavelength=408 nm) is 1.54598.

The Abbe's number "vd" of each of the scanning lens 51 and 52 (d-line) is 55.8.

Figure 11:
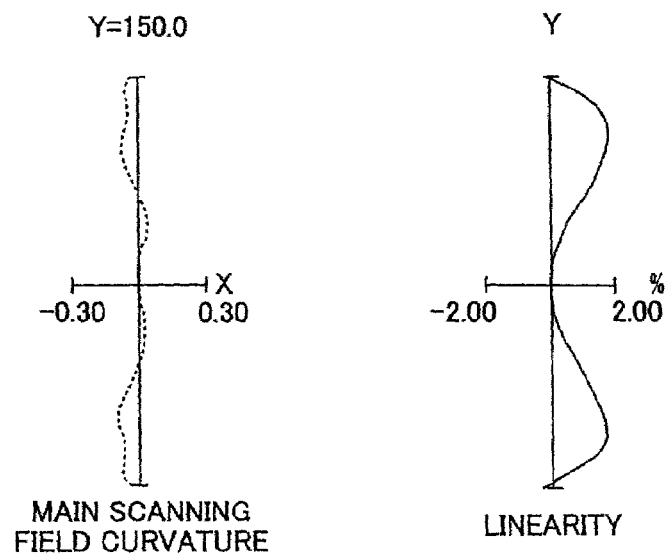
FIG. 11A and FIG. 11B are diagrams for explaining main-scanning field-curvature and linearity characteristics of the optical scanning device of the present embodiment.

FIG. 11A and FIG. 11B show the main-scanning field-curvature and linearity characteristics of the optical scanning device of FIG. 10.

As shown in FIG. 11B, the maximum amount of linearity (Lm) over the entire image surface (around the point corresponding to the image height Y=±105 mm) is about +1.6%, and the amount of linearity (Le) at the outer peripheral end of the image surface (corresponding to the image height Y=150 mm) is about −0.3%.

Figure 12:
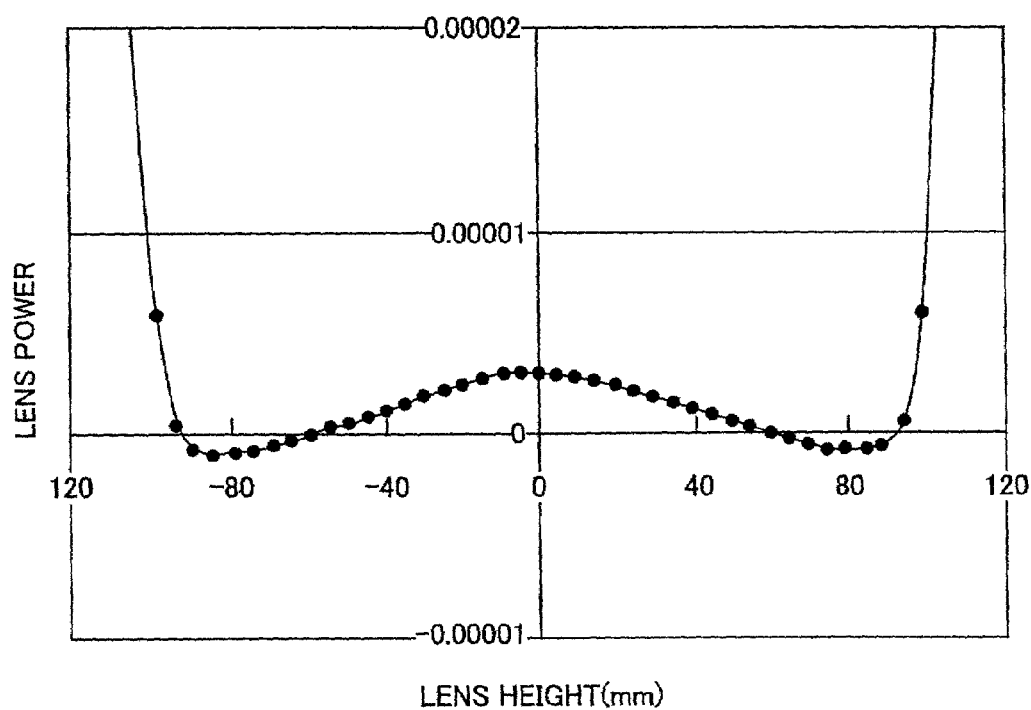
FIG. 12 is a diagram for explaining lens height vs. lens power characteristics of the optical scanning device of FIG. 7.

FIG. 12 shows the lens height vs. lens power characteristics of the second scanning lens 52 of the optical scanning device 50 of FIG. 7. As shown in FIG. 12, the second scanning lens 52 is configured to have a distribution of lens power over lens height in which the lens power is gradually decreased from the center of the lens height (H=0) to an inflection point (H=±80 mm) near the outer periphery of the lens height, and the lens power is rapidly increased from the inflection point to the outer periphery of the lens height.

Figure 13:
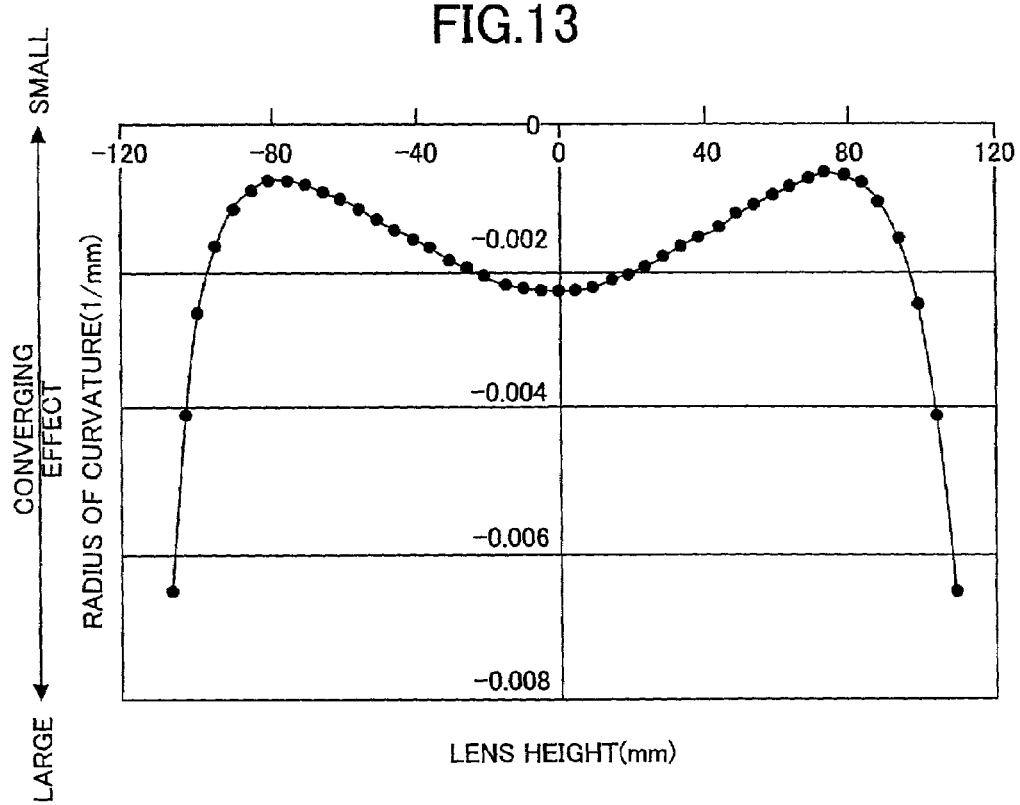
FIG. 13 is a diagram for explaining lens height vs. converging effect characteristics of the optical scanning device of FIG. 10.

FIG. 13 shows the lens height vs. converging effect characteristics of the second surface (R4) of the second scanning lens 52 of the optical scanning device 50 of FIG. 10. As shown in FIG. 13, the second surface (R4) of the second scanning lens 52 is configured to have a distribution of radius of curvature over lens height in which the radius of curvature in the main scanning direction is gradually increased from the center of the lens height (H=0) to an inflection point (H=±80 mm) near the outer periphery of the lens height, and the radius of curvature is rapidly decreased from the inflection point to the outer periphery of the lens height. The second surface (R4) of the second scanning lens 52 is the nearest one among the lens surfaces of the scanning lens device 50 to the image surface. The increase of the radius of curvature as in the distribution of FIG. 13 means the decrease of the converging effect of the scanning lens.

In the optical scanning device of the present embodiment, the when the beam spot is located near the center of the image surface in the main scanning direction, the pixel clock generating unit 80 generates the pixel clock at the initial frequency. As shown in FIG. 11B, the linearity at the center of the image surface is nearly equal to zero. The frequency dividing unit 90 generates the secondary frequency of the pixel clock at its output, which is equal to the initial frequency of the pixel clock at its input divided by eight (the divisor integer=8). The pixel clock output from the frequency dividing unit 90 is supplied to the laser writing unit 70 concurrently with the image signal. The laser writing unit 70 controls the light source 11 (the laser diode) so that the light source 11 is turned on and off in accordance with the image signal based on the secondary frequency of the pixel clock at the output of the frequency dividing unit 90. Hence, the light source 11 emits the laser light beam based on the secondary frequency. In this condition, the electrical correction unit 90*a* does not act to adjust the secondary frequency of the pixel clock at the output of the frequency dividing unit 90. Namely, the secondary frequency, which is the frequency at which the ON/OFF state of the light source 11 is controlled by the optical writing unit 70, is set at one-eighth of the initial frequency of the pixel clock generating unit 80.

When the beam spot is located near the maximum-linearity point of the image surface (image height Y=±105 mm), the electrical correction unit 90*a* adjusts the secondary frequency of the pixel clock at the output of the frequency dividing unit 90 with respect to each of respective pixels included in the image signal. As shown in FIG. 11B, the linearity at the maximum-linearity point of the image surface (image height Y=±105 mm) is set at about 1.6%. In this condition, L=1.6%=1.6/100≈1/64=1/(8×8). Specifically, the electrical correction unit 90*a* controls the frequency dividing unit 90 such that the secondary frequency of the pixel clock at the output of the frequency dividing unit 90 is set at one seventh of the initial frequency of the pixel clock generating unit 80 (i.e., the divisor integer is seven) at the rate of 1:8, and the secondary frequency is set at one eighth of the initial frequency (i.e., the divisor integer is eight) at the rate of 7:8.

When the beam spot is located near the outer peripheral end of the image surface in the main scanning direction (image height Y=±150 mm), the electrical correction unit 90*a* adjusts the secondary frequency of the pixel clock at the output of the frequency dividing unit 90 with respect to each of respective pixels included in the image signal. As shown in FIG. 11B, the linearity at the outer peripheral end of the image surface (image height Y=±150 mm) is set at about −0.3%. In this condition, L=−0.3%=−0.3/100≈−1/328=−1/(8×41). Specifically, the electrical correction unit 90a controls the frequency dividing unit 90 such that the secondary frequency of the pixel clock at the output of the frequency dividing unit 90 is set at one ninth of the initial frequency of the pixel clock generating unit 80 (i.e., the division divisor integer is nine) at the rate of 1:41, and the secondary frequency is set at one eighth of the initial frequency (i.e., the divisor integer is eight) at the rate of 40:41.

According to the optical scanning device of the above-described embodiment, it is possible to provide good performance for the optical characteristics by using the electrical correction unit that obtains the uniform-velocity characteristics with the use of a certain amount of the linearity at the outer peripheral end or the maximum-linearity point of the image surface.

In the above-described embodiments, the secondary frequency is set at one-eighth of the initial frequency of the pixel clock generating unit 80. Alternatively, the secondary frequency may be set at one sixteenth of the initial frequency of the pixel clock generating unit 80. In such alternative embodiment, it is possible to increase the accuracy of adjusting of the secondary frequency at which the ON/OFF state of the light source is controlled by the optical writing unit 70.

In the above-described embodiments, the present invention is applied to a single-beam scanning device only. However, the present invention is not limited to these embodiments. The optical scanning device of the present invention may be applied to a multi-beam scanning device as well, and, in such a case, it is possible to provide a high-speed image forming system by incorporating the optical scanning device of the present invention therein.

The present invention is not limited to the above-described embodiments, and variations and modifications may be made without departing from the scope of the present invention.

Further, the present invention is based on Japanese priority application No. 2000-339241, filed on Nov. 7, 2000, and Japanese priority application No. 2001-078550, filed on Mar. 19, 2001, the entire contents of which are hereby incorporated by reference.

What is claimed is:

1. An optical scanning device comprising:
  a light source emitting a light beam based on a pixel clock;
  a scanning optical system scanning an image surface in a main scanning direction, by focusing a deflected light beam, derived from the light beam of the light source, onto the image surface as a beam spot, the scanning optical system providing an amount of linearity at an outer peripheral end of the image surface;
  an optical writing unit controlling ON/OFF state of the light source in accordance with an image signal;
  a frequency dividing unit, connected to the optical writing unit, generating a secondary frequency of the pixel clock at an output thereof, which is equal to an initial frequency of the pixel clock at an input thereof divided by a divisor integer; and
  an electrical correction unit configured to adjust the secondary frequency of the pixel clock at the output of the frequency dividing unit with respect to each of respective pixels included in the image signal while the amount of linearity remaining at the outer peripheral end of the image surface is provided by the scanning optical system, when the beam spot is located near the outer peripheral end of the image surface, so as to obtain uniform-velocity characteristics,
  wherein the scanning optical system is configured to satisfy the conditions 0.5% ≦|Lin|≦10% where Lin indicates the amount of the linearity, and
  the scanning optical system including a scanning lens device having lens surfaces that are concentric with respect to a reflection point of a rotary deflector, and the number of the concentric lens surfaces in the scanning lens device is either equal to or larger than the number of non-concentric lens surfaces in the scanning lens device.

2. The optical scanning device according to claim 1, wherein the scanning lens device comprises a first scanning lens located near the rotary deflector and a second scanning lens located near the image surface, each of the first and second scanning lenses being a positive lens, the first scanning lens having a refractive lens power larger than a refractive lens power of the second scanning lens.

3. The optical scanning device according to claim 1, wherein at least one of the lens surfaces included in the scanning lens device is formed into a high-order aspherical shape in a main-scanning cross-section thereof.

4. An optical scanning device comprising:
  light source means for emitting a light beam based on a pixel clock;
  scanning optical system means for scanning an image surface in a main scanning direction by focusing a deflected light beam, derived from the light beam of the light source means, onto the image surface as a beam spot, the scanning optical system means providing an amount of linearity at an outer peripheral end of the image surface;
  optical writing means for controlling an ON/OFF state of the light source means in accordance with an image signal;
  frequency dividing means, connected to the optical writing means, for generating a secondary frequency of the pixel clock at an output thereof, which is equal to an initial frequency of the pixel clock at an input thereof divided by a divisor integer; and
  electrical correction means for adjusting the secondary frequency of the pixel clock at the output of the frequency dividing means with respect to each of respective pixels included in the image signal while the amount of linearity remaining at the outer peripheral end of the image surface is provided by the scanning optical system, when the beam spot is located near the outer peripheral end of the image surface, so as to obtain uniform-velocity characteristics,
  wherein the scanning optical system means is configured to satisfy the conditions 0.5% ≦|Lin|≦10% where Lin indicates the amount of the linearity, and
  the scanning optical system means includes a scanning lens device having lens surfaces that are concentric with respect to a reflection point of a rotary deflector, and the number of the concentric lens surfaces in the scanning lens device is either equal to or larger than the number of non-concentric lens surfaces in the scanning lens device.

5. An image forming system in which an optical scanning device and an image forming device are provided, the image forming device forming a latent image on an image surface of a photoconductor by using a beam spot created by the optical scanning device, the optical scanning device comprising:

a light source configured to emit a light beam based on a pixel clock;

a scanning optical system configured to scan the image surface in a main scanning direction by focusing a deflected light beam, derived from the light beam of the light source, onto the image surface as the beam spot, the scanning optical system configured to provide an amount of linearity at an outer peripheral end of the image surface;

an optical writing unit configured to control an ON/OFF state of the light source in accordance with an image signal;

a frequency dividing unit connected to the optical writing unit configured to generate a secondary frequency of the pixel clock at an output thereof, which is equal to an initial frequency of the pixel clock at an input thereof divided by a divisor integer; and an electrical correction unit configured to adjust the secondary frequency of the pixel clock at the output of the frequency dividing unit with respect to each of respective pixels included in the image signal while the amount of linearity remaining at the outer peripheral end of the image surface is provided by the scanning optical system, when the beam spot is located near the outer peripheral end of the image surface, so as to obtain uniform-velocity characteristics, wherein the scanning optical system is configured to satisfy the conditions 0.5% ≦|Lin|≦10% where Lin indicates the amount of the linearity, and the scanning optical system includes a scanning lens device having lens surfaces that are concentric with respect to a reflection point of a rotary deflector, and the number of the concentric lens surfaces in the scanning lens device is either equal to or larger than the number of non-concentric lens surfaces in the scanning lens device.

6. An optical scanning device comprising:

a light source configured to emit a light beam based on a pixel clock;

a scanning optical system configured to scan an image surface in a main scanning direction by focusing a deflected light beam, derived from the light beam of the light source, onto the image surface as a beam spot, the scanning optical system configured to provide a maximum amount of linearity Lm over the entire image surface at a maximum-linearity point of the image surface and an amount of linearity Le at an outer peripheral end of the image surface, the scanning optical system being configured to satisfy the condition |Lm/Le|>1.0;

an optical writing unit configured to control an ON/OFF state of the light source in accordance with an image signal;

a frequency dividing unit, connected to the optical writing unit, configured to generate a secondary frequency of the pixel clock at an output thereof, which is equal to an initial frequency of the pixel clock at an input thereof divided by a divisor integer; and an electrical correction unit configured to adjust the secondary frequency of the pixel clock at the output of the frequency dividing unit with respect to each of respective pixels included in the image signal while the amount of linearity remaining at the outer peripheral end of the image surface is provided by the scanning optical system, when the beam spot is located near one of the maximum-linearity point and the outer peripheral end of the image surface, so as to obtain uniform-velocity characteristics, wherein the scanning optical system is configured to satisfy the conditions 0.5% ≦|Lin|≦10% where Lin indicates the amount of the linearity, and the scanning optical system includes a scanning lens device having lens surfaces that are concentric with respect to a reflection point of a rotary deflector, and the number of the concentric lens surfaces in the scanning lens device is either equal to or larger than the number of non-concentric lens surfaces in the scanning lens device.

7. The optical scanning device according to claim 6, wherein the scanning optical system is configured to provide the maximum amount of linearity Lm over the entire image surface and the amount of linearity Le at the outer peripheral end of the image surface, which satisfy the conditions Lm>0 and |Le|≦5%.

8. The optical scanning device according to claim 6, wherein the scanning lens device comprises a first scanning lens located near the rotary deflector and a second scanning lens located near the image surface, each of the first and second scanning lenses being a positive lens, the first scanning lens having a refractive lens power larger than a refractive lens power of the second scanning lens.

9. The optical scanning device according to claim 6, wherein at least one of the lens surfaces included in the scanning lens device is configured to have a distribution of radius of curvature over lens height in which the radius of curvature is gradually increased from a center of the lens height to an inflection point near an outer periphery of the lens height, and the radius of curvature is decreased from the inflection point to the outer periphery of the lens height.

10. The optical scanning device according to claim 6, wherein at least one of scanning lenses included in the scanning lens device is configured to have a distribution of lens power over lens height in which the lens power is gradually decreased from a center of the lens height to an inflection point near an outer periphery of the lens height, and the lens power is increased from the inflection point to the outer periphery of the lens height.

11. The optical scanning device according to claim 6, wherein at least one of the lens surfaces included in the scanning lens device is formed into a high-order aspherical shape in a main-scanning cross-section thereof.

12. An optical scanning device comprising:

light source means for emitting a light beam based on a pixel clock;

scanning optical system means for scanning an image surface in a main scanning direction by focusing a deflected light beam, derived from the light beam of the light source means, onto the image surface as a beam spot, the scanning optical system means providing a maximum amount of linearity Lm over the entire image surface at a maximum-linearity point and an amount of linearity Le at an outer peripheral end of the image surface, the scanning optical system means being configured to satisfy the condition |Lm/Le|>1.0;

optical writing means for controlling an ON/OFF state of the light source means in accordance with an image signal;

frequency dividing means, connected to the optical writing means, for generating a secondary frequency of the pixel clock at an output thereof, which is equal to an initial frequency of the pixel clock at an input thereof divided by a divisor integer; and electrical correction means for adjusting the secondary frequency of the pixel clock at the output of the frequency dividing means with respect to each of respective pixels included in the image signal while the amount of linearity remaining at the outer peripheral end of the image surface is provided by the scanning optical system, when the beam spot is located near one of the maximum-linearity point and the outer peripheral end of the image surface, so as to obtain uniform-velocity characteristics, wherein the scanning optical system means is configured to satisfy the conditions 0.5% ≦|Lin|≦10% where Lin indicates the amount of the linearity, and the scanning optical system means includes a scanning lens device having lens surfaces that are concentric with respect to a reflection point of a rotary deflector, and the number of the concentric lens surfaces in the scanning lens device is either equal to or larger than the number of non-concentric lens surfaces in the scanning lens device.

13. An image forming system in which an optical scanning device and an image forming device are provided, the image forming device forming a latent image on an image surface of a photoconductor by using a beam spot created by the optical scanning device, the optical scanning device comprising:

a light source configured to emit a light beam based on a pixel clock;

a scanning optical system configured to scan an image surface in a main scanning direction by focusing a deflected light beam, derived from the light beam of the light source, onto the image surface as a beam spot, the scanning optical system configured to provide a maximum amount of linearity Lm over the entire image surface at a maximum-linearity point and an amount of linearity Le at an outer peripheral end of the image surface, the scanning optical system being configured to satisfy the condition |Lm/Le|>1.0;

an optical writing unit configured to control an ON/OFF state of the light source in accordance with an image signal;

a frequency dividing unit, connected to the optical writing unit, configured to generate a secondary frequency of the pixel clock at an output thereof, which is equal to an initial frequency of the pixel clock at an input thereof divided by a divisor integer; and an electrical correction unit configured to adjust the secondary frequency of the pixel clock at the output of the frequency dividing unit with respect to each of respective pixels included in the image signal while the amount of linearity remaining at the outer peripheral end of the image surface is provided by the scanning optical system, when the beam spot is located near one of the maximum-linearity point and the outer peripheral end of the image surface, so as to obtain uniform-velocity characteristics, wherein the scanning optical system is configured to satisfy the conditions 0.5% ≦|Lin|≦10% where Lin indicates the amount of the linearity, and the scanning optical system includes a scanning lens device having lens surfaces that are concentric with respect to a reflection point of a rotary deflector, and the number of the concentric lens surfaces in the scanning lens device is either equal to or larger than the number of non-concentric lens surfaces in the scanning lens device.

* * * * *